(12) United States Patent
Bak et al.

(10) Patent No.: US 7,706,665 B2
(45) Date of Patent: *Apr. 27, 2010

(54) RECORDING MEDIUM CONTAINING THUMBNAIL RECORDED THEREON, RECORDING APPARATUS AND METHOD THEREFOR, AND REPRODUCING APPARATUS AND METHOD THEREFOR

(75) Inventors: Bong-gil Bak, Seoul (KR); Hee-soo Lee, Gyeonggi-do (KR); Tae-yun Chung, Gyeonggi-do (KR); Hyun-kwon Chung, Gyeonggi-do (KR); Sung-wook Park, Seoul (KR)

(73) Assignee: Samsung Electronics Co., Ltd. (KR)

( * ) Notice: Subject to any disclaimer, the term of this patent is extended or adjusted under 35 U.S.C. 154(b) by 1627 days.

This patent is subject to a terminal disclaimer.

(21) Appl. No.: 10/937,501

(22) Filed: Sep. 10, 2004

(65) Prior Publication Data

US 2005/0031311 A1    Feb. 10, 2005

Related U.S. Application Data

(63) Continuation of application No. 10/414,499, filed on Apr. 16, 2003, now Pat. No. 7,466,901.

(60) Provisional application No. 60/372,812, filed on Apr. 17, 2002.

(51) Int. Cl.
*H04N 7/00* (2006.01)

(52) U.S. Cl. .................. 386/95; 386/125; 715/838; 348/461

(58) Field of Classification Search ............... 386/95, 386/125; 715/838; 348/461
See application file for complete search history.

(56) References Cited

U.S. PATENT DOCUMENTS

| 6,912,327 | B1 * | 6/2005 | Hori et al. ............ 382/305 |
| 2004/0039934 | A1 * | 2/2004 | Land et al. ............ 713/200 |

* cited by examiner

*Primary Examiner*—Thai Tran
*Assistant Examiner*—Girumsew Wendmagegn
(74) *Attorney, Agent, or Firm*—NSIP Law (57) ABSTRACT

A recording medium includes a program containing video data and/or audio data and navigation information which defines a thumbnail, wherein the thumbnail relates to the program and is reproduceable as moving pictures. The recording medium may include a plurality of programs and the thumbnail may identify or represent one or more of the programs. By assigning a predetermined interval of a bit stream corresponding to a program as a thumbnail, the recording medium having the thumbnail thereon, that can be reproduced as moving pictures, can be obtained.

24 Claims, 10 Drawing Sheets

RECORDING MEDIUM CONTAINING THUMBNAIL RECORDED THEREON, RECORDING APPARATUS AND METHOD THEREFOR, AND REPRODUCING APPARATUS AND METHOD THEREFOR

CROSS-REFERENCE TO RELATED APPLICATIONS

This application is a continuation of U.S. application Ser. No. 10/414,499 filed on Apr. 16, 2003 now U.S. Pat. No. 7,466,901, and claims the benefit of U.S. Provisional Application Ser. No. 60/372,812, filed on Apr. 17, 2002, in the United States Patent and Trademark Office, the disclosure of which is incorporated herein by reference.

BACKGROUND OF THE INVENTION

1. Field of the Invention

The present invention relates to a recording medium having a thumbnail recorded thereon, a recording apparatus and a method of recording thereof, and a reproducing apparatus and a method reproducing thereof, and more particularly, to a recording medium having a thumbnail that identifies or represents at least one program recorded thereon, a recording apparatus and a method of recording thereof, and a reproducing apparatus and a method reproducing thereof.

2. Description of the Related Art

Generally, a thumbnail means a picture having a thumbnail size, and refers to a small image having relatively large original data than can be quickly retrieved, so as to manage a large amount of images or data.

Typically, N Audio/Video (A/V) bit streams, to which audio data and/or video data are multiplexed, are recorded on a conventional recording medium having the above described thumbnail. Here, a bit stream means a program in which the content of a movie or a music video is recorded. However, since the conventionally defined thumbnail is formed of one still picture, a thumbnail pointer, as navigation information indicating the thumbnail, indicates one location of a bit stream. That is, according to a conventional thumbnail defining method, only a still picture, which does not contain audio data, can be defined. Therefore, even in a program containing moving picture contents such as a movie or a music video, a thumbnail, which is provided as access information, is formed only of a still picture. Therefore, it is inadequate for the thumbnail represented by one still picture to identify or represent the moving picture contents, or to convey the content of a program to a user.

SUMMARY OF THE INVENTION

Accordingly, it is an aspect of the present invention to provide a recording medium having a thumbnail recorded thereon, wherein the thumbnail is reproduced in moving pictures so as to appropriately represent and easily identify a program corresponding to the thumbnail, a recording apparatus and a method of recording thereof, and a reproducing apparatus and a method reproducing thereof.

Additional objects and advantages of the invention will be set forth in part in the description which follows and, in part, will be obvious from the description, or may be learned by practice of the invention.

To achieve the above and/or other aspects of the present invention, there is provided a recording medium comprising a program having video data and/or audio data, and navigation information which defines a thumbnail, wherein the thumbnail relates to the program and is reproduceable as moving pictures.

The navigation information may include an identifier of the program, and a reproduction start location and a reproduction end location in the program.

The navigation information may include an identifier of the program, and a reproduction start time and a reproduction end time of the program.

The reproduction start time and reproduction end time may be expressed by identifiers of a start frame and a last frame, respectively, forming the thumbnail.

The navigation information may include an identifier of the program, a reproduction start frame identifier, and a reproduction last frame identifier or a reproduction length time of the program.

The reproduction start time and reproduction end time may be recorded as an identifier of a predetermined frame included in the thumbnail, and at least a predetermined number of frames included in the thumbnail, respectively.

The navigation information may further include additional effect information which defines an additional effect to be used in reproducing the thumbnail at beginning and ending times of a thumbnail playback.

The additional effect information may include a field which defines that a fade-in is used in reproducing the thumbnail at the beginning time of the thumbnail playback.

The additional effect information may further include a field which defines that a fade-out is used in reproducing the thumbnail at the beginning time of the thumbnail playback.

The additional effect information may further include a field which defines that a freeze after the thumbnail playback is used in reproducing the thumbnail.

To achieve the above and/or other aspects of the present invention, there is provided a method of recording data on a recording medium, the method comprising recording a program having video data and/or audio data, and recording navigation information which defines a thumbnail, wherein the thumbnail relates to the program and is reproduceable as moving pictures.

To achieve the above and/or other aspects of the present invention, there is provided another method of recording data on a recording medium on which a program containing video data and/or audio data is recorded, the method comprising receiving information which defines a thumbnail, wherein the thumbnail relates to the program and is reproduceable as moving pictures, and recording navigation information which is generated based on the received information and defines the thumbnail.

The recording of the navigation information may comprise recording an identifier of the program as location information of the navigation information, and recording a reproduction start location and a reproduction end location in the program as interval information of the navigation information.

The recording of the navigation information may comprise recording an identifier of the as part of the navigation information, and recording a reproduction start time, and a reproduction end time or a reproduction time length of the program as another part of the navigation information.

The recording of the navigation information may comprise recording an identifier of the as part of the navigation information, and recording a reproduction start frame identifier, and a reproduction last frame identifier or a reproduction length time as another part of the navigation information.

The method may further comprise recording additional effect information which defines an additional effect that is used in reproducing the thumbnail.

The recording of the additional effect information may comprise recording additional effect information which defines that a fade-in is used in a first half of reproduction.

The recording of the additional effect information may further comprise recording additional effect information which defines that a fade-out is used in a second half of reproduction.

The recording of the additional effect information may further comprise recording additional effect information which defines that a freeze after a playback is used in a second half of reproduction.

To achieve the above and/or other aspects of the present invention, there is provided a method of reproducing data from a recording medium on which a program containing video data and/or audio data is recorded, the method comprising reading navigation information which defines a thumbnail relating to the program; and reproducing the thumbnail based on the navigation information.

The reading of the navigation information may comprise reading an identifier of the program as location information of the navigation information, and reading a reproduction start location and a reproduction end location in the program as interval information of the navigation information.

The reading of the navigation information may comprise reading an identifier of the program as part of the navigation information, and reading a reproduction start time and a reproduction end time as another part of the navigation information.

The reading of the navigation information may comprise reading an identifier of the program as part of the navigation information, and reading a reproduction start frame identifier, and a reproduction end frame identifier or a reproduction length time as another part of the navigation information.

To achieve the above and/or other aspects of the present invention, there is provided a recording apparatus for recording data on a recording medium, comprising a control unit which generates navigation information that defines a thumbnail, wherein the thumbnail relates to a program containing video data and/or audio data and reproduceable as moving pictures, and a recording unit which records the program, and the navigation information which is provided from the control unit, with respect to the recording medium.

To achieve the above and/or other aspects of the present invention, there is provided a recording apparatus for recording data on a recording medium on which a program containing video data and/or audio data is recorded, the recording apparatus comprising a control unit which generates navigation information that defines a thumbnail, wherein the thumbnail relates to the program and is reproduceable as moving pictures, and a recording unit which records the navigation information provided by the control unit with respect to the recording medium.

The control unit may generate an identifier of the program, a reproduction start location and a reproduction end location in the program, as the navigation information, and the recording unit may record the identifier of the program, the reproduction start location and reproduction end location in the program which are provided by the control unit.

The control unit may generate an identifier of the program, a reproduction start time and a reproduction end time of the program, as the navigation information, and the recording unit may record the identifier of the program, the reproduction start time and reproduction end time generated by the control unit.

The reproduction start time and reproduction end time may be identifiers of a start frame and a last frame, respectively, forming the thumbnail.

The control unit may generate an identifier of the program, a reproduction start time and a reproduction continuing time of the program, as the navigation information, and the recording unit may record the identifier of the program, the reproduction start time, and the reproduction continuing time which are generated by the control unit.

The reproduction start time and reproduction continuing time may be recorded as an identifier of a predetermined frame included in the thumbnail and at least a predetermined number of frames included in the thumbnail, respectively.

The control unit may further generate additional effect information which defines an additional effect to be used in reproducing the thumbnail, and the recording unit may further record the additional effect information generated by the control unit with respect to the recording medium.

The additional effect information may define that a fade-in is used in a first half of reproduction.

The additional effect information may further define that a fade-out is used in a second half of reproduction.

The additional effect information may further define that a freeze after a playback is used in a second half of reproduction.

To achieve the above and/or other aspects of the present invention, there is provided a reproducing apparatus for reproducing data from a recording medium on which a program containing video data and/or audio data is recorded, comprising a control unit which interprets navigation information that defines a thumbnail relating to the program, and a reading unit which reads the navigation information and provides the read navigation information to the control unit, and according to the navigation information which is interpreted and provided by the control unit, reads the thumbnail.

The reading unit may read a plurality of frames forming the thumbnail based on the navigation information which is interpreted and provided by the control unit.

The reproducing apparatus may further comprise a decoder which receives and decodes the thumbnail read by the reading unit.

The reading unit may read an identifier of the program, a reproduction start location and a reproduction end location in the program, as navigation information, and provide the navigation information to the control unit.

The reading unit may read an identifier of the program, a reproduction start time and a reproduction end time of the program, as the navigation information and provide the navigation information to the control unit.

The control unit may provide a reproduction start location and a reproduction end location which are mapped to the reproduction start time and the reproduction end time provided by the reading unit.

The reading unit may read identifiers of a start frame and a last frame forming the thumbnail as the reproduction start time and the reproduction end time, respectively, and provide the identifiers to the control unit.

The reading unit may read an identifier of the program, a reproduction start time and a reproduction continuing time of the program, as the navigation information, and provide the navigation information to the control unit.

The reading unit may read an identifier of a predetermined frame included in the thumbnail and at least a predetermined number of frames included in the thumbnail as the reproduction start time and the reproduction continuing time, respectively, and provide the identifier and the number of frames to the control unit.

The reading unit may further read additional effect information which defines an additional effect in reproducing the thumbnail, and provide the additional effect information to the control unit.

The reading unit may read the additional effect information which defines that a fade-in is used in a first half of the reproduction, and provide the additional effect information to the control unit.

The reading unit may further read the additional effect information which defines that a fade-out is used in a second half of the reproduction, and provide the additional effect information to the control unit.

The reading unit may further read the additional effect information which defines that a freeze after a playback is used in a second half of the reproduction, and provide the additional effect information to the control unit.

BRIEF DESCRIPTION OF THE DRAWINGS

These and/or other aspects and advantages of the present invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below in order to explain the present invention by referring to the figures.

Figure 1:
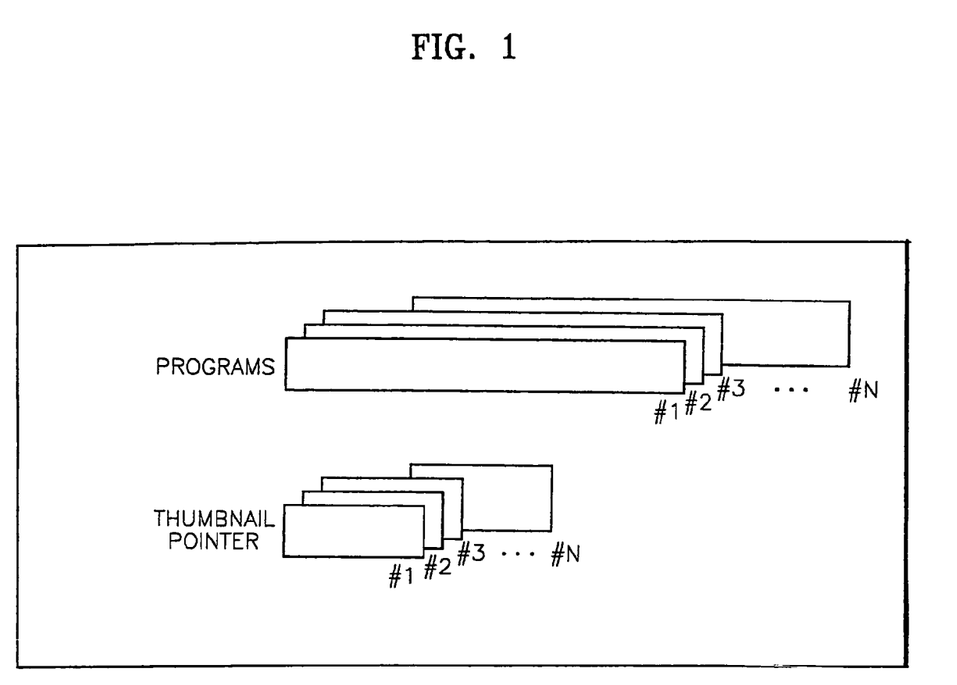
FIG. 1 is a reference diagram to explain a recording medium according to an embodiment of the present invention.

FIG. 1 shows a recording medium according to an embodiment of the present invention. On this recording medium, for example, an optical disc, N programs are recorded as presentation data, and N thumbnail pointers, each corresponding to one of the programs, are recorded as navigation information. For example, each program containing a moving picture content of a movie or a music video is recorded as one bit stream according to the present invention. A bit stream is digital data to which video data and/or audio data is multiplexed. However, it is understood a program may be recorded as one or more bit streams as desired.

Figure 2:
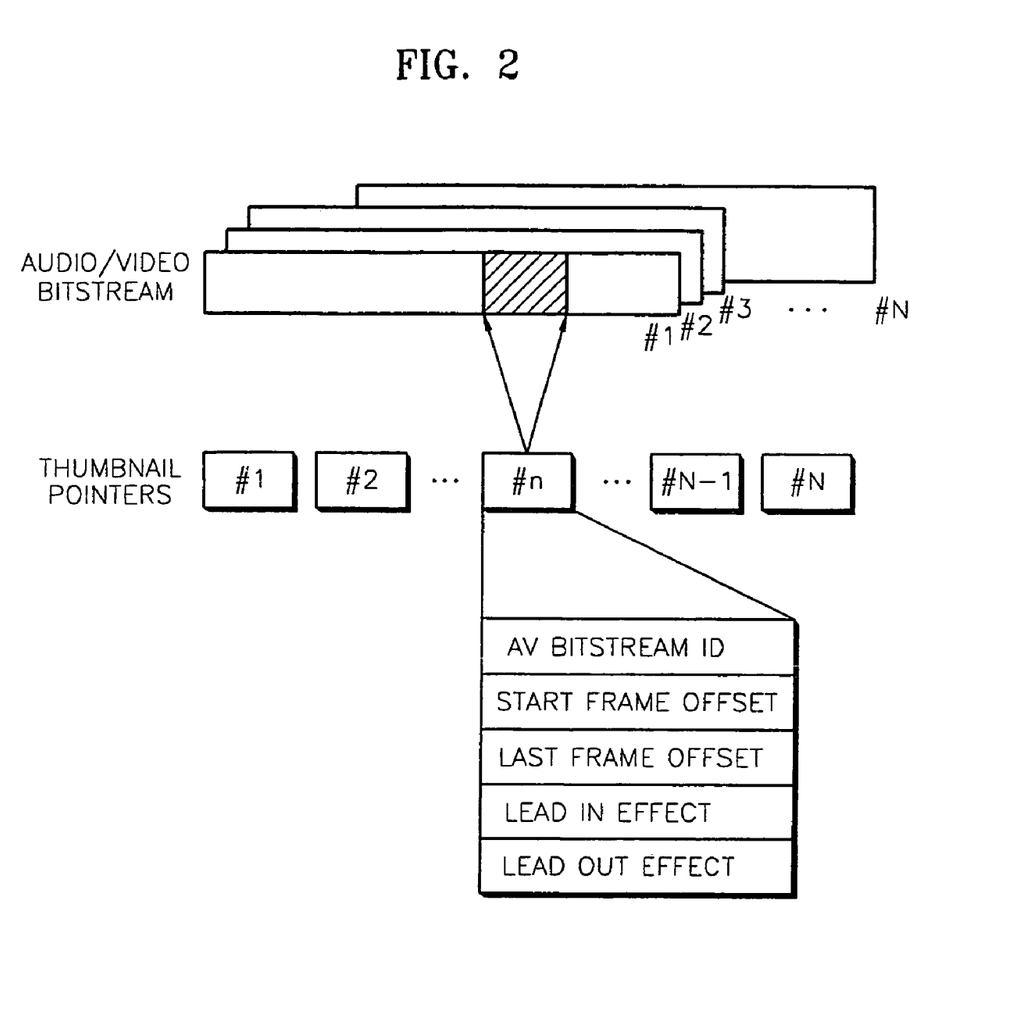
FIG. 2 is a diagram illustrating a relationship between a program of FIG. 1 and a thumbnail pointer.

FIG. 2 illustrates a relationship between one of the programs of FIG. 1 and a thumbnail pointer. Referring to FIG. 2, the thumbnail pointer #n points to one interval of a bit stream corresponding to the thumbnail pointer #n. More specifically the thumbnail pointer #n includes a bit stream identifier (AV bitstream ID), a start frame offset, and a last frame offset. Additionally, the thumbnail pointer may include a lead in effect and a lead out effect.

The bit stream identifier is a field to select a bit stream corresponding to the thumbnail among N bit streams. The start frame offset and the last frame offset are fields for the thumbnail pointer #n which is one of navigation information that defines the thumbnail according to the present embodiment. The start frame offset and the last frame offset have values which are expressed so that a file system can access a location in which the start frame is recorded, and a location in which the last frame is recorded, in the selected bit stream. Accordingly, the thumbnail corresponds to a part marked by slanted lines in the bit stream, as shown in FIG. 2, and can be reproduced as moving pictures.

The lead in effect and the lead out effect are fields that define screen processing effects, and may be added as additional effects where the thumbnail is reproduced. The lead IN effect assigns a screen processing effect introduced in the first half of reproduction, while the lead out effect assigns a screen processing effect introduced in the second half of reproduction. For example, as a lead-in effect, a fade-in may be used, and as a lead-out effect, a fade-out or a freeze-after-playback may be used. With these effects, the thumbnail can be more smoothly and effectively reproduced. However, since the lead-in effect and lead-out effect are not essential fields for defining a thumbnail which is reproduced as moving pictures, the effects may be omitted, or changed to other additional effects as desired.

Figure 3:
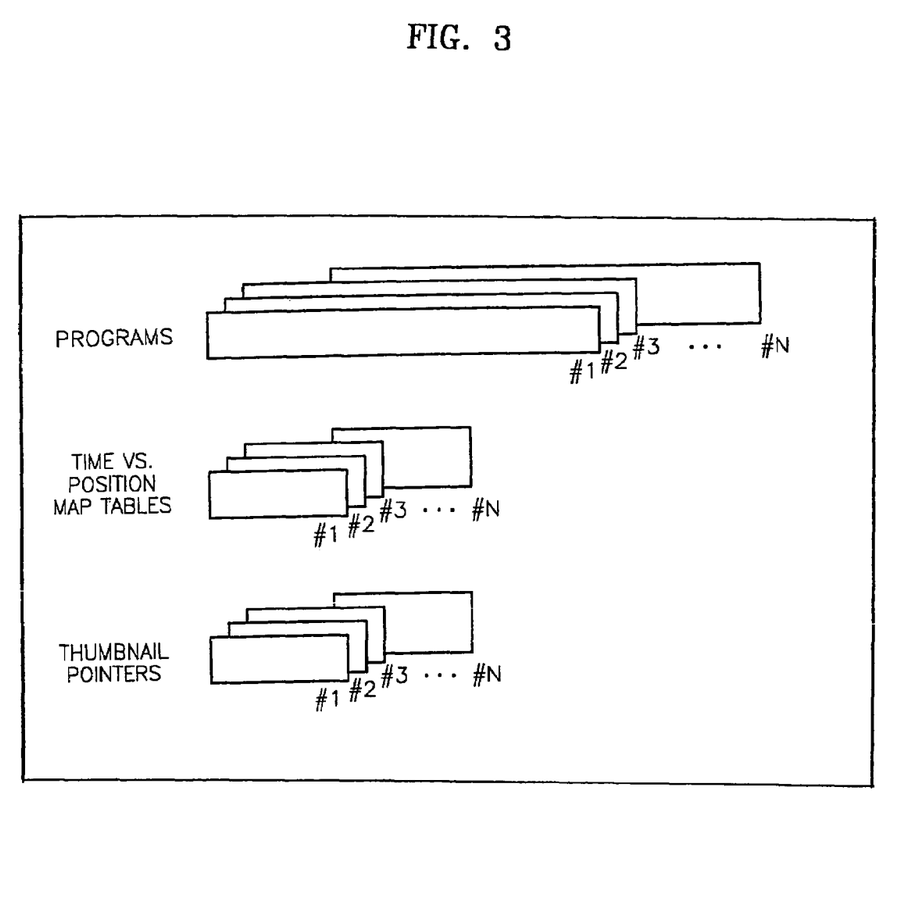
FIG. 3 is a reference diagram to explain a recording medium according to another embodiment of the present invention.

FIG. 3 shows a recording medium according to another embodiment of the present invention. Referring to FIG. 3, on this recording medium, for example, a Digital Video Disc (DVD), N programs are recorded as presentation data, N map tables and thumbnail pointers corresponding to the programs, respectively, are recorded as navigation information. For example, a program is recorded as one bit stream according to the present embodiment. A bit stream is digital stream data to which video data and/or audio data are multiplexed. However, each program may be recorded as one or more bit streams as desired.

A map table is used to map reproducing time information of predetermined data to location information to which a file system can access, and a thumbnail pointer points to a thumbnail defined for each bit stream.

Figure 4:
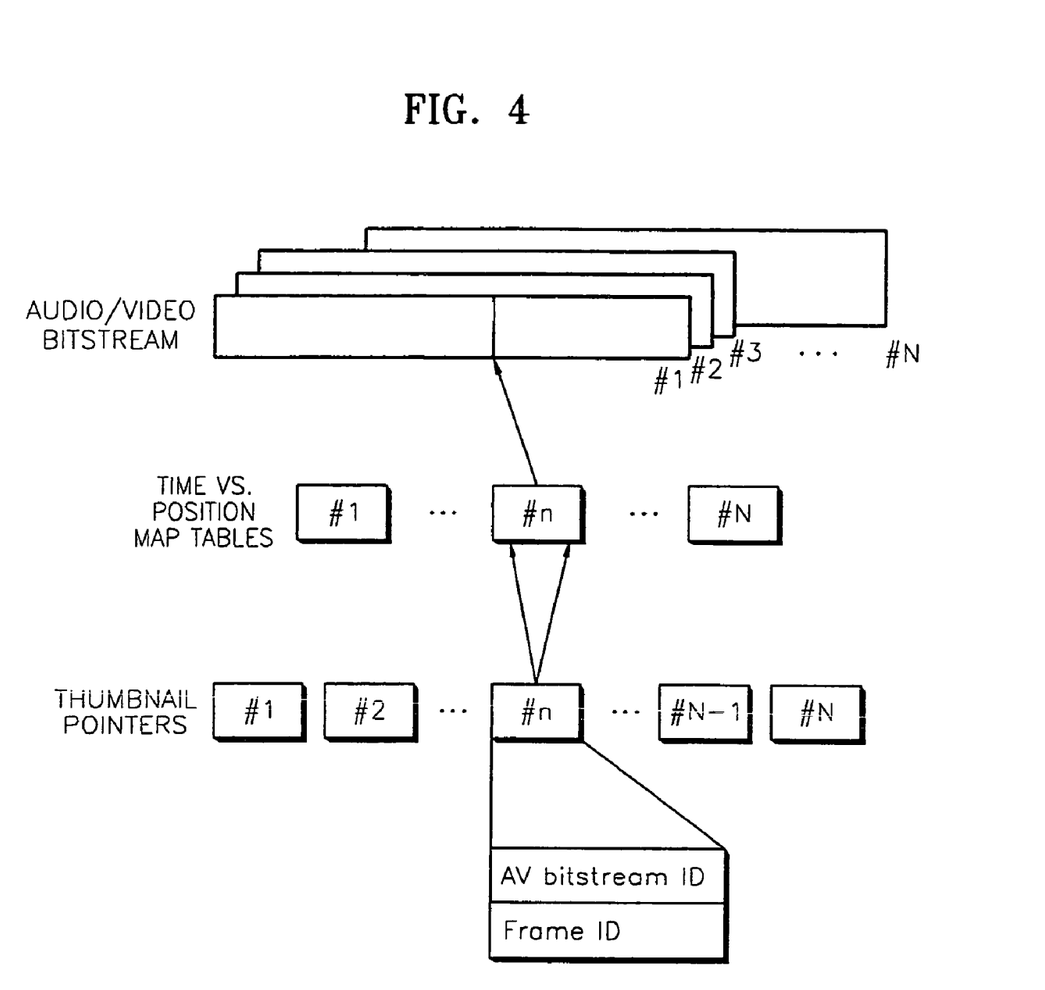
FIG. 4 is a diagram illustrating a relationship between a program of FIG. 3 and a thumbnail pointer.

FIG. 4 illustrates a relationship between one of the programs of FIG. 3 and a thumbnail pointer. Referring to FIG. 4, the thumbnail pointer #n points to an interval of a corresponding bit stream through a map table. More specifically, the thumbnail pointer includes a bit stream identifier (AV bitstream ID), and a frame ID that may include a start frame identifier (Start Frame ID) (not shown) and a last frame identifier (Last Frame ID) (not shown). Also, where desired, the thumbnail pointer may include a lead in effect, and a lead out effect.

The bit stream identifier is navigation information and is a field to select a bit stream corresponding to the thumbnail among the N bit streams. The start frame identifier and the last frame identifier are navigation information that define the thumbnail according to the present embodiment, and particularly, correspond to reproduction interval information.

Moving pictures are implemented by quickly showing a plurality of still pictures slightly differently expressed. That is, to implement the moving pictures, a predetermined number of still pictures per second (for example, 30 pictures per second) may be shown. Each still picture that forms the moving pictures is referred to as a frame, and a number of frames shown per second is referred to as a frame rate. Therefore, a frame identifier has the same meaning as reproducing time information. The map table is a kind of navigation information defined to comply with DVD specifications, and maps reproducing time information of a predetermined data item and recording location information. Therefore, where the map table #n corresponding to the thumbnail pointer #n is referred to, the value of a location in which an assigned thumbnail is recorded can be found based on an identifier of a start frame and an identifier of a last frame. By doing so, the thumbnail is reproduced as moving pictures by frames from the frame having the identifier of the start frames to the frame having the identifier of the last frame.

The lead-in effect and the lead-out effect are fields that define screen processing effects, and may be added as additional effects where the thumbnail is reproduced. The lead-in effect assigns a screen processing effect which is introduced in the first half of reproduction, while the lead-out effect assigns a screen processing effect which is introduced in the second half of reproduction. For example, as a lead-in effect, a fade-in may be used, and as a lead-out effect, a fade-out or a freeze-after-playback may be used. With these effects, the thumbnail can be more smoothly and effectively reproduced. Since the lead-in effect and lead-out effect are not essential fields for defining a thumbnail which is reproduced as moving pictures, the effects may be omitted, or changed to other additional effects as desired.

Figure 5:
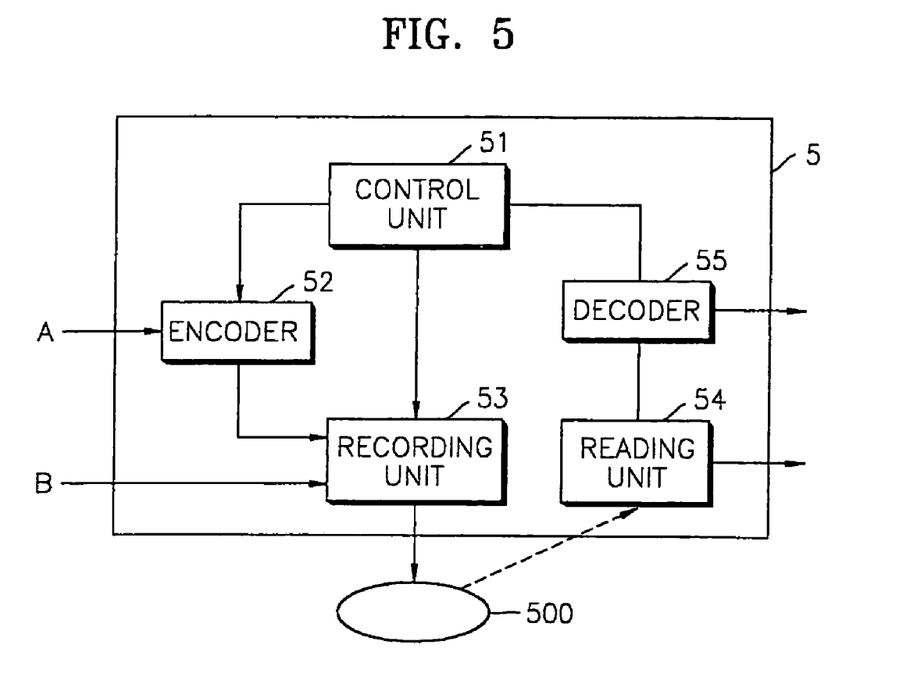
FIG. 5 is a block diagram of a recording apparatus for assigning a thumbnail according to yet another embodiment of the present invention.

FIG. 5 shows a block diagram of a recording apparatus for assigning a thumbnail according to yet another embodiment of the present invention. The recording apparatus 5 is an apparatus which can be used by a manufacturer to manufacture an optical disc of the present invention, for example, a DVD, or can be used by an ordinary user to record a desired program or a thumbnail.

The recording apparatus 5 may include a control unit 51, an encoder 52, and a recording unit 53, so as to record a predetermined program and thumbnail desired by a manufacturer on an optical disc 500. The control unit 51 generates navigation information which defines a thumbnail to a program having video data and/or audio data. The recording unit 53 records the program on the optical disc 500, and records the navigation information provided by the control unit 51. Where the program is input as not-encoded data A, the encoder 52 encodes the data and sends the encoded data to the recording unit 53. Where the program is input as encoded digital data B, the data is directly sent to the recording unit 53 and recorded on the optical disc 500.

The recording apparatus may include the control unit 51, the encoder 52, the recording unit 53, and a reading unit 54 and/or a decoder 55, so as to record a predetermined program and thumbnail desired by a user on the optical disc 500. The operations of the control unit 51, the encoder 52, and the recording unit 53 are the same as explained above. The reading unit 54 reads a program and directly outputs the program where there is no need for a decoding, or sends the program to the decoder 55 where a decoding is needed. The decoder 55 decodes the received program and outputs the decoded program.

Where a user watches or listens to the program being reproduced through a display apparatus (not shown) or a speaker (not shown), which is interfaced to the reading unit 54 or the decoder 55, and desires to assign an interval of the program as a thumbnail, the user may input the start and end of the interval as a beginning and an ending of the thumbnail through the control unit 51. Then, the control unit 51 generates a thumbnail pointer (and a map table) so as to define the interval from a reproduction start location to a reproduction end location input by the user as a thumbnail.

Here, navigation information defining the thumbnail according to the present embodiment includes location information that indicates a corresponding bit stream in which the thumbnail is recorded, and reproduction interval information that indicates an interval defined as the thumbnail in the corresponding bit stream. The location information is represented by a bit stream identifier. The reproduction interval information is represented by the reproduction start location and the reproduction end location of the interval which are assigned as the thumbnail of the selected bit stream, or by a reproduction start time and a reproduction end time of the interval.

Here, the reproduction start location and the reproduction end location may be expressed by offset values of a file system corresponding to a start location and an end location in an area in which data of the interval defined as the thumbnail is recorded, or may be expressed by identifiers of a start frame and a last frame forming the thumbnail. Also, the navigation information that defines the thumbnail may include a field that defines a screen processing effect to be used in reproducing the thumbnail. Thus, a thumbnail pointer is navigation information which defines a thumbnail according to the present embodiment, and may contain a field which defines a screen processing effect, as described above.

Figure 6:
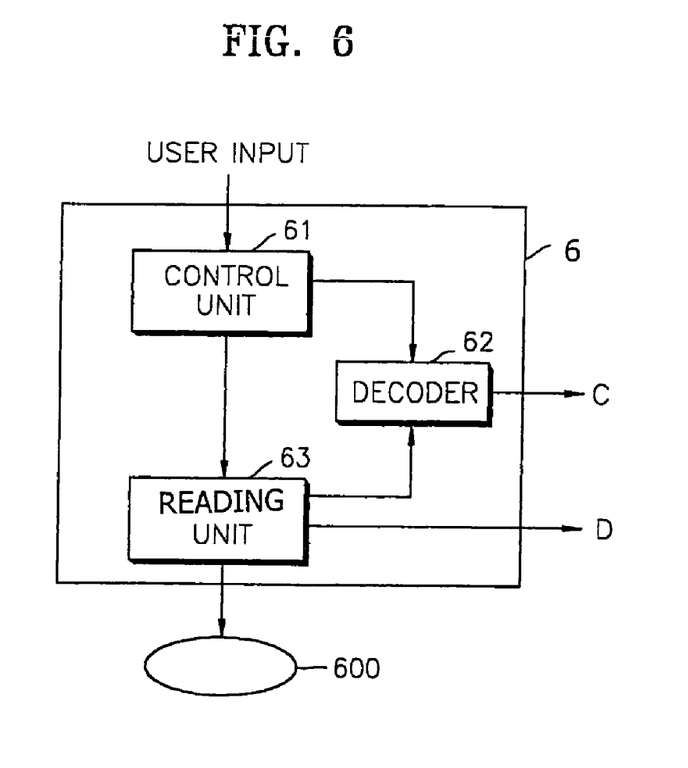
FIG. 6 is a block diagram of a reproducing apparatus for reproducing a thumbnail according to still another embodiment of the present invention.

FIG. 6 shows a block diagram of a reproducing apparatus for reproducing a thumbnail according to still another embodiment of the present invention. The reproducing apparatus 6 is an apparatus which may be used by a user to reproduce a desired program or thumbnail. The reproducing apparatus 6 reproduces a predetermined program and/or thumbnail which are recorded on an optical disc 600 by a manufacturer or by the user. The reproducing apparatus 6 includes a control unit 61, a decoder 62, and a reading unit 63.

The reading unit 63 reads navigation information recorded on the optical disc 600. The reproducing apparatus 6 decodes a thumbnail recorded as a bit stream and outputs the thumbnail C, or outputs the digital bit stream D. For example, where the reproducing apparatus 6 includes or is interfaced to a speaker (not shown) and/or a display unit (not shown), the thumbnail is output through the decoder 62. Where the reproducing apparatus 6 is connected to another digital apparatus (not shown) or a network through a digital interface, the thumbnail is output as a not-decoded digital bit stream.

The navigation information defining the thumbnail includes location information that indicates a corresponding bit stream in which the thumbnail is recorded, and reproduction interval information that indicates an interval defined as the thumbnail in the corresponding bit stream. The location information is represented by a bit stream identifier. The reproduction interval information is represented by a reproduction start location and a reproduction end location of the interval assigned as the thumbnail of a selected bit stream, or by a reproduction start time and a reproduction end time of the interval.

Here, the reproduction start location and the reproduction end location may be expressed by offset values of a file system corresponding to a start location and an end location in an area in which data of the interval defined as the thumbnail is recorded, or may be expressed by identifiers of a start frame and a last frame forming the thumbnail. Also, the navigation information which defines the thumbnail may include a field that defines a screen processing effect to be used in reproducing the thumbnail. Here, a thumbnail pointer is navigation information which defines a thumbnail according to the present embodiment, and may contain a field which defines a screen processing effect, as described above.

A recording and reproducing method according to the present invention based on the structure described above will now be explained.

Figure 7:
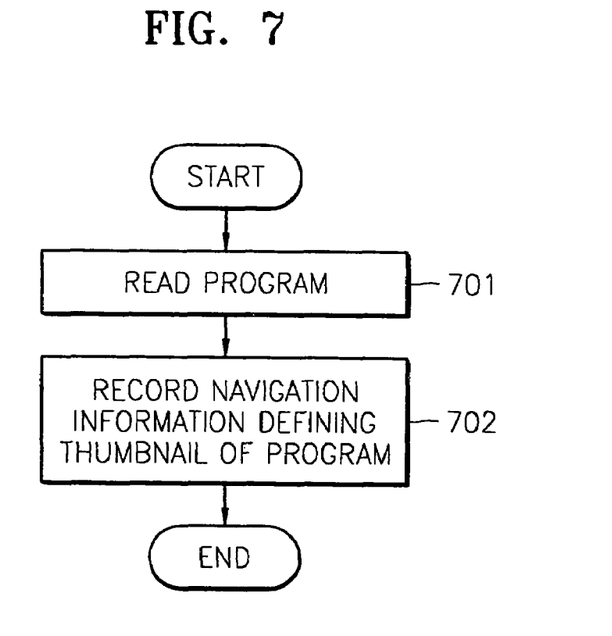
FIG. 7 is a flowchart illustrating a method of recording a thumbnail according to the present invention.

FIG. 7 shows a flowchart illustrating a method of recording a thumbnail according to the present invention. Through the method of FIG. 7, a manufacturer of the optical disc 500 and an ordinary user may record a program and thumbnail as desired, using for example, the recording apparatus 5. The recording apparatus 5 receives a predetermined program from the outside and records the program on the optical disc 500 through the recording unit 53 in operation 701. At this time, the input program A is encoded by the encoder 52 and then recorded, or where the program B is already encoded and input, the input program is recorded without the encoding process. Next, the control unit 51 records navigation information which defines a thumbnail to the program in a predetermined area of the optical disc 500 in operation 702.

Figure 8:
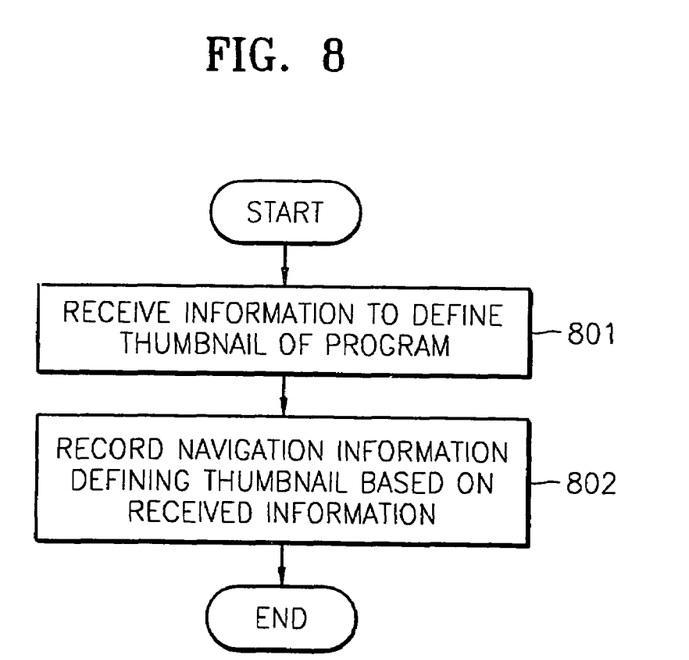
FIG. 8 is a flowchart illustrating another method of recording a thumbnail according to the present invention.

FIG. 8 shows a flowchart illustrating another method of recording a thumbnail according to the present invention. Through the method of FIG. 8, while reproducing a program already recorded on the optical disc 500, a user may assign an interval of the program as a thumbnail. That is, the user can record navigation information by selecting a reproduction start location and a reproduction end location corresponding to, for example, a beginning and an ending of the interval through the control unit 51, using the recording apparatus 5.

Referring to FIG. 8, where the control unit 51 of the recording apparatus 5 receives information to define a thumbnail to the corresponding program in operation 801, the control unit 51 generates navigation information based on the received information, and the recording unit 53 records the generated navigation information on a predetermined area of the optical disc 500 in operation 802.

Figure 9:
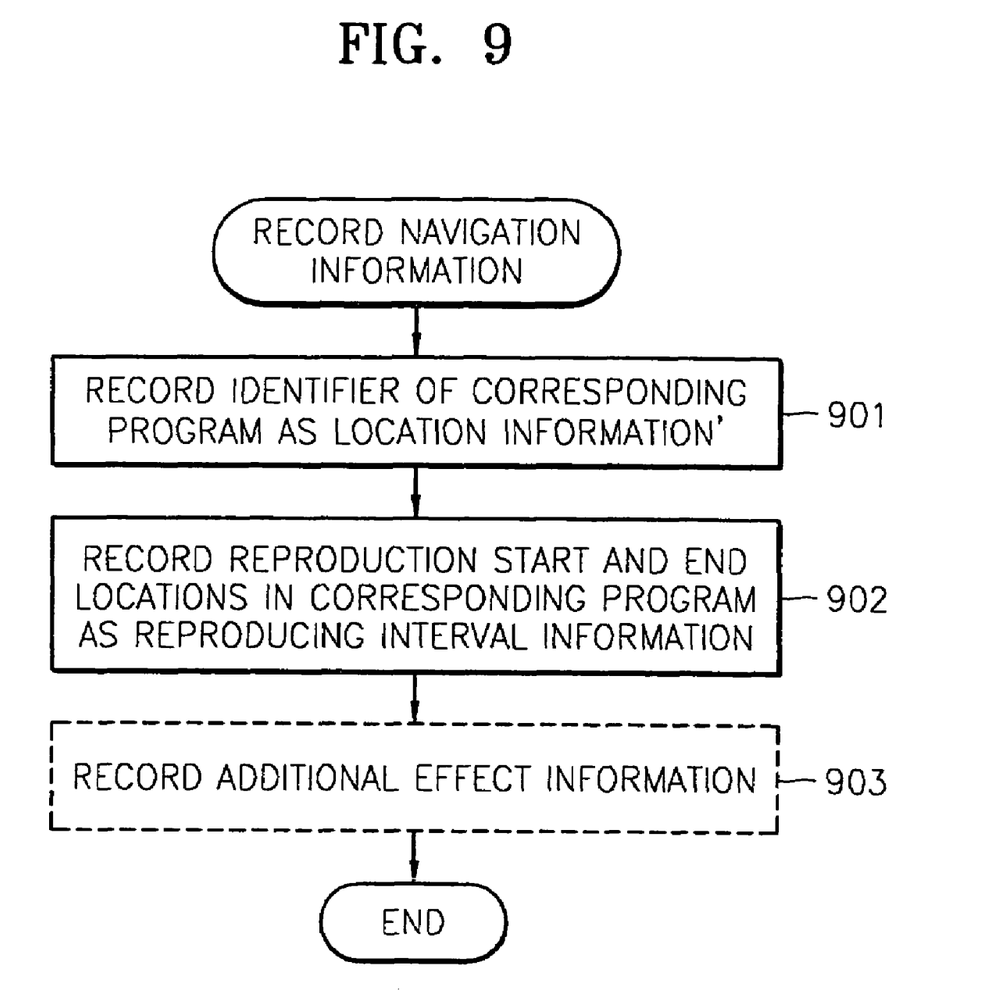
FIG. 9 is a flowchart illustrating an example of an operation 802 of FIG. 8.

FIG. 9 shows a flowchart illustrating an example of the operation 802 of FIG. 8. For example, while reproducing an interval which a user wants to assign as a thumbnail, begins or finishes, the user may push a button (not shown), which is in the recording apparatus 5, to indicate a reproduction start location or a reproduction end location. In response, the control unit 51 sends an identifier of the program currently being reproduced as location information of the thumbnail, to the recording unit 53, and the recording unit 53 records the generated program identifier in operation 901. The control unit 51 detects the locations which are being reproduced in a corresponding bit stream when the button is pushed, that is, the reproduction start location and the reproduction end location, as reproduction interval information of the thumbnail, and sends the locations to the recording unit 53. The recording unit 53 records the received reproduction start location and reproduction end location as navigation information in operation 902. As described above, the reproduction start location and reproduction end location may be expressed by offset values which can be accessed through a file system as a start location and an end location of the interval defined as the thumbnail.

Thereafter, the control unit 51 sends additional effect information, which is set as a default or is selected and input by the user, to the recording unit 53. The recording unit 53 records the input additional effect information as part of navigation information in operation 903. However, the operation 903 to record the additional effect information may be omitted.

Figure 10:
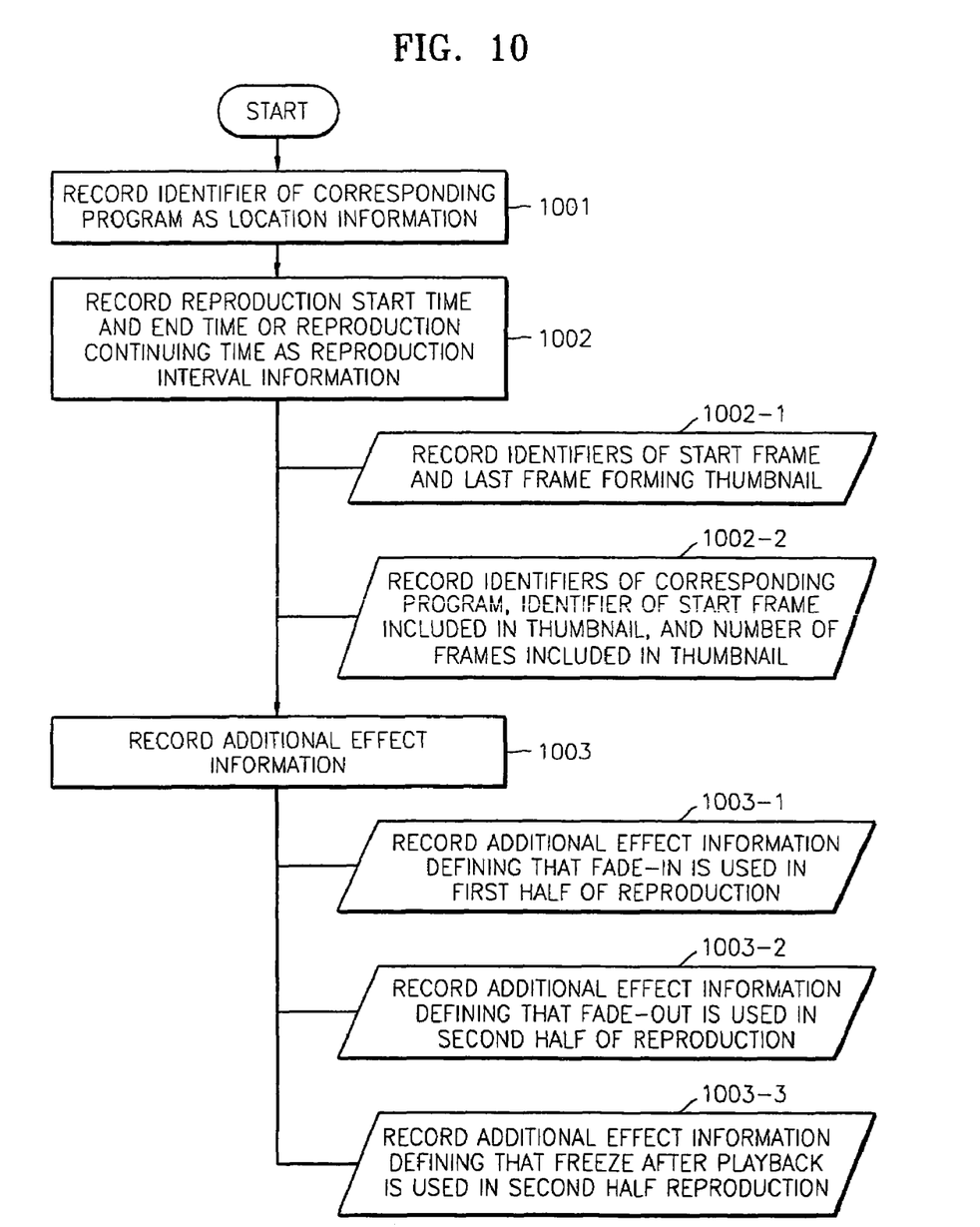
FIG. 10 is a flowchart illustrating another example of an operation 802 of FIG. 8.

FIG. 10 shows a flowchart illustrating another example of the operation 802 of FIG. 8. Referring to FIG. 10, the control unit 51 sends an identifier of a corresponding program as location information of a thumbnail to the recording unit 53, and the recording unit 53 records the generated program identifier in operation 1001. In addition, the control unit 51 generates a reproduction start location and a reproduction end location in the corresponding program, and the recording unit 53 records the generated reproduction start location and reproduction end location in operation 1002. Here, reproduction interval information, that is, a reproduction start time and a reproduction end time/reproduction continuation time, may be recorded as identifiers of a first frame and a last frame forming the thumbnail, in operation 1002-1, or may be recorded as an identifier of a start frame forming the thumbnail and at least a predetermined number of frames included in the thumbnail, in operation 1002-2.

Thereafter, the control unit 51 outputs additional effect information, which is set as a default or is selected and input by the user, and the recording unit 53 records the additional effect information in operation 1003. Here, the additional effect information may be recorded as information defining that a fade-in is used in the first half of reproduction, in operation 1003-1, as information defining that a fade-out is used in the second half of reproduction, in operation 1003-2, or as information defining that a freeze after a playback is used in the second half of reproduction, in operation 1003-3. Although described, the operation to record the additional effect information may be omitted.

Figure 11:
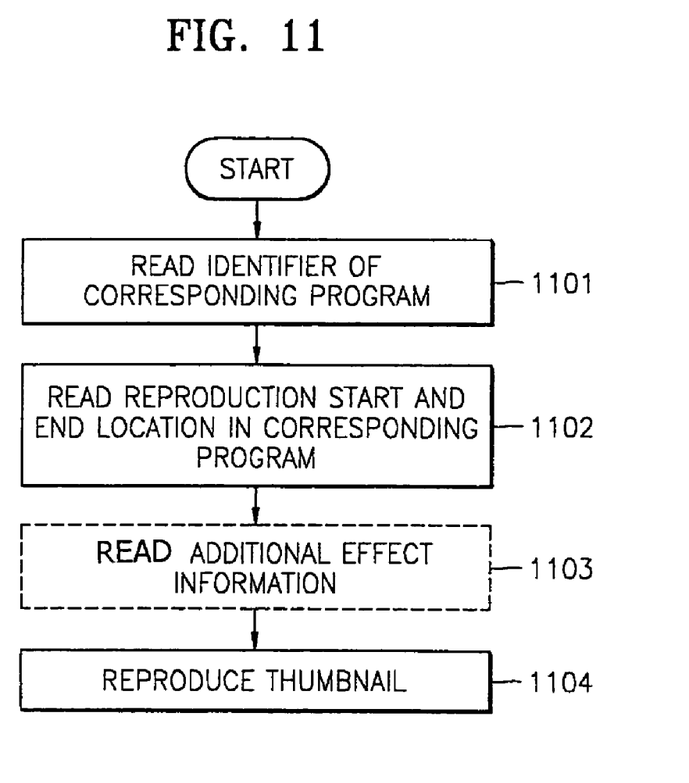
FIG. 11 is a flowchart illustrating a method of reproducing a thumbnail according to the present invention.

FIG. 11 shows a flowchart illustrating a method of reproducing a thumbnail according to the present invention. The reproducing apparatus 6 reads navigation information that defines a thumbnail to a program from the optical disc 600, so as to reproduce the thumbnail based on the obtained navigation information.

Where a user requests reproduction of a thumbnail to a predetermined program through a menu screen, the reading unit 63 reads an identifier of the corresponding program as navigation information in operation 1101, and reads a reproduction start location and a reproduction end location in the corresponding program in operation 1102. Here, as described above, the reproduction start location and reproduction end location means offset values which can be accessed by a file system. Also, the reading unit 63 may read additional effect information defined to reproduce the thumbnail and send the additional effect information to the control unit 61 in operation 1103. The control unit 61 reproduces the thumbnail based on the received navigation information in operation 1104.

Figure 12:
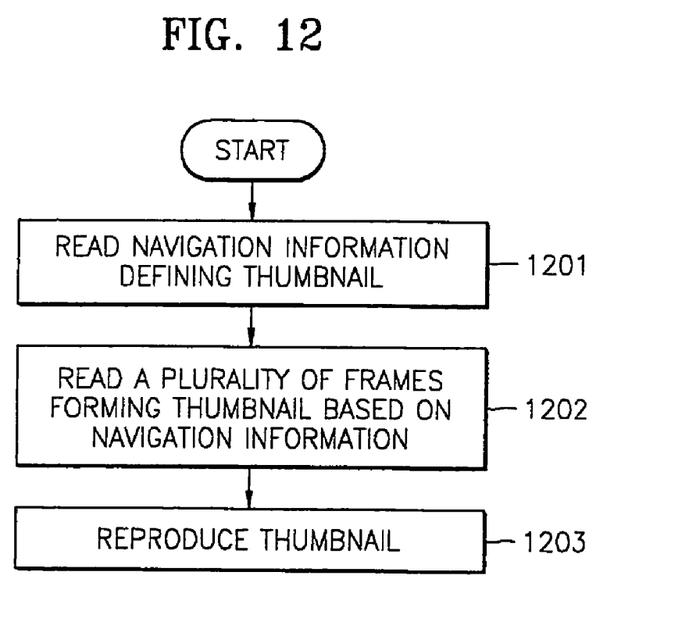
FIG. 12 is a flowchart illustrating another method of reproducing a thumbnail according to the present invention.

FIG. 12 shows a flowchart illustrating another method of reproducing a thumbnail according to of the present invention. Where a user requests reproduction of a thumbnail to a predetermined program, the reading unit 63 reads location information and reproduction interval information as navigation information that defines the thumbnail in operation 1201. Thereafter, the control unit 61 interprets the obtained location information and reproduction interval information and sends the interpreted information to the reading unit 63. Based on the received information, the reading unit 63 reads and reproduces a plurality of frames forming the thumbnail in operation 1202.

Figure 13:
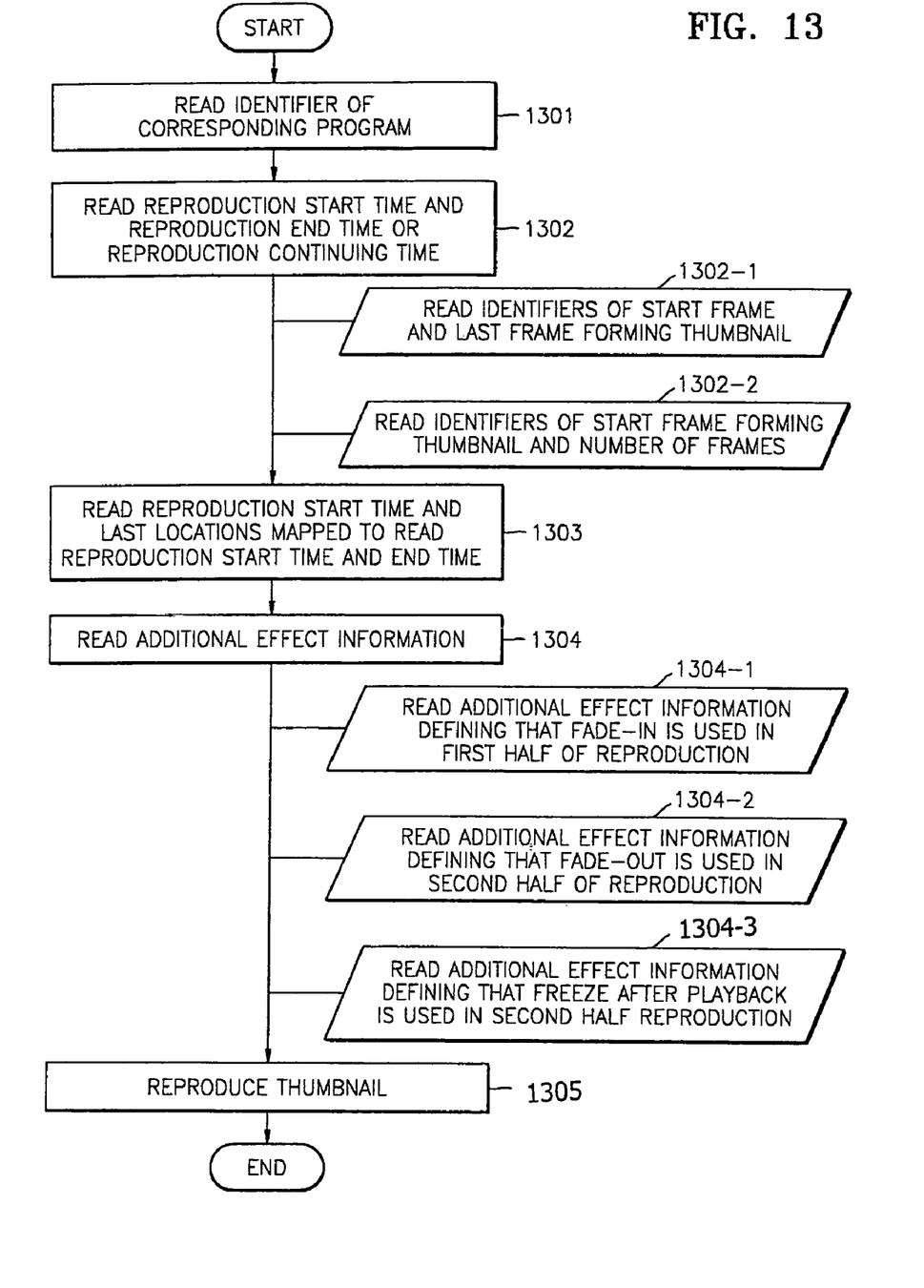
FIG. 13 is a flowchart illustrating yet another method of reproducing a thumbnail according to the present invention.

FIG. 13 shows a flowchart illustrating yet another method of reproducing a thumbnail according to the present invention. Where a user requests reproduction of a thumbnail to a predetermined program through a menu screen, the reading unit 63 reads an identifier of the corresponding program recorded on a predetermined area of the optical disc 600 in operation 1301. Also, the reading unit 63 reads a reproduction start time and a reproduction end time in operation 1302. Here, the recording unit 63 may read identifiers of a start frame and a last frame forming the thumbnail as the reproduction start time and the reproduction end time/reproduction continuation time, in operation 1302-1, or may read an identifier of a start frame forming the thumbnail and at least a predetermined number of frames included in the thumbnail as the reproduction start time and the reproduction end time/reproduction continuation time, in operation 1302-2.

In operation 1303, referring to a corresponding map table, the control unit 61 extracts the reproduction start location and reproduction end location mapped to the obtained reproduction start time and reproduction end time/reproduction continuation time, and the reading unit 63 reads the reproduction start location and reproduction end location. The reading unit 63 also reads additional effect information in operation 1304. That is, the reading unit 63 may read additional effect information defining that a fade-in is used in the first half of reproduction, in operation 1304-1, defining that a fade-out is used in the second half of reproduction, in operation 1304-2, or defining that a freeze after a playback is used in the second half of reproduction, in operation 1304-3. However, where the additional effect information is not recorded on the optical disc 600, the operation to read the additional effect information may be omitted.

The control unit 61 makes the data forming the thumbnail, that is, frames, read and reproduced based on the obtained program identifier, the reproduction start time and the reproduction end time (and additional effect information), to reproduce the thumbnail in operation 1305.

As described above, according to the present invention, by assigning a predetermined interval of a bit stream corresponding to a program as a thumbnail, a recording medium having a thumbnail thereon, that can be reproduced as moving pictures, can be obtained. Also, the present invention discloses an apparatus and a method of recording a thumbnail that can be reproduced as moving pictures, and a reproducing apparatus and a method of reproducing thereof.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A reproducing apparatus for reproducing data from a recording medium on which a program containing video data and/or audio data is recorded, comprising:
   a reading unit which reads navigation information that defines a thumbnail which reproduces at least a portion of the program and is reproducible as moving pictures, from the recording medium; and
   a control unit which reproduces the thumbnail based on the navigation information,
   wherein the navigation information comprises an identifier of the program, and a reproduction start time and a reproduction duration time in the program.

2. The reproducing apparatus of claim 1, wherein the control unit reproduces a plurality of frames forming the thumbnail based on the navigation information which is read and provided by the control unit.

3. The reproducing apparatus of claim 1, further comprising a decoder which receives and decodes the thumbnail.

4. The reproducing apparatus of claim 1, wherein the reading unit reads an identifier of the program, a reproduction start location and a reproduction end location in the program, as the navigation information, and provides the navigation information to the control unit.

5. The reproducing apparatus of claim 1, wherein the reading unit reads an identifier of the program, a reproduction start time and a reproduction end time of the program, as the navigation information, and provides the navigation information to the control unit.

6. The reproducing apparatus of claim 5, wherein the control unit provides a reproduction start location and a reproduction end location which are mapped to the reproduction start time and the reproduction end time provided by the reading unit.

7. The reproducing apparatus of claim 5, wherein the reading unit reads identifiers of a start frame and a last frame forming the thumbnail as the reproduction start time and the reproduction end time, and provides the identifiers to the control unit.

8. The reproducing apparatus of claim 1, wherein the reading unit reads an identifier of the program, a reproduction start time and a reproduction continuing time of the program, as the navigation information, respectively, and provides the navigation information to the control unit.

9. The reproducing apparatus of claim 8, wherein the reading unit reads an identifier of a predetermined frame included in the thumbnail and at least a predetermined number of frames included in the thumbnail as the reproduction start time and reproduction continuing time, respectively, and provides the identifier and the number of frames to the control unit.

10. The reproducing apparatus of claim 1, wherein the reading unit reads additional effect information which defines an additional effect in reproducing the thumbnail, and provides the additional effect information to the control unit.

11. The reproducing apparatus of claim 10, wherein the reading unit reads the additional effect information which defines that a fade-in is used in a first half of the reproduction of the thumbnail, and provides the additional effect information to the control unit.

12. The reproducing apparatus of claim 11, wherein the reading unit further reads the additional effect information which defines that a fade-out is used in a second half of the reproduction of the thumbnail, and provides the additional effect information to the control unit.

13. The reproducing apparatus of claim 11, wherein the reading unit further reads the additional effect information which defines that a freeze after a playback is used in a second half of the reproduction of the thumbnail, and provides the additional effect information to the control unit.

14. The reproducing apparatus of claim 2, further comprising a decoder which receives and decodes the thumbnail.

15. The reproducing apparatus of claim 2, wherein the reading unit reads an identifier of the program, a reproduction start location and a reproduction end location in the program, as the navigation information, and provides the navigation information to the control unit.

16. The reproducing apparatus of claim 2, wherein the reading unit reads an identifier of the program, a reproduction start time and a reproduction end time of the program, as the navigation information, and provides the navigation information to the control unit.

17. The reproducing apparatus of claim 16, wherein the control unit provides a reproduction start location and a reproduction end location which are mapped to the reproduction start time and the reproduction end time provided by the reading unit.

18. The reproducing apparatus of claim 16, wherein the reading unit reads identifiers of a start frame and a last frame forming the thumbnail as the reproduction start time and the reproduction end time, and provides the identifiers to the control unit.

19. The reproducing apparatus of claim 2, wherein the reading unit reads an identifier of the program, a reproduction start time and a reproduction continuing time of the program, as the navigation information, respectively, and provides the navigation information to the control unit.

20. The reproducing apparatus of claim 19, wherein the reading unit reads an identifier of a predetermined frame included in the thumbnail and at least a predetermined number of frames included in the thumbnail as the reproduction start time and reproduction continuing time, respectively, and provides the identifier and the number of frames to the control unit.

21. The reproducing apparatus of claim 2, wherein the reading unit reads additional effect information which defines an additional effect in reproducing the thumbnail, and provides the additional effect information to the control unit.

22. The reproducing apparatus of claim 21, wherein the reading unit reads additional effect information which defines that a fade-in is used in a first half of the reproduction of the thumbnail, and provides the additional effect information to the control unit.

23. The reproducing apparatus of claim 22, wherein the reading unit further reads additional effect information which defines that a fade-out is used in a second half of the reproduction of the thumbnail, and provides the additional effect information to the control unit.

24. The reproducing apparatus of claim 22, wherein the reading unit further reads additional effect information which defines that a freeze after a playback is used in a second half of the reproduction of the thumbnail, and provides the additional effect information to the control unit.

* * * * *